Aug. 27, 1963

A. E. TRAVER 3,101,611

ANALYZER FOR INTERNAL COMBUSTION ENGINES

Filed July 20, 1960

Aug. 27, 1963         A. E. TRAVER         3,101,611
ANALYZER FOR INTERNAL COMBUSTION ENGINES
Filed July 20, 1960                   2 Sheets-Sheet 2
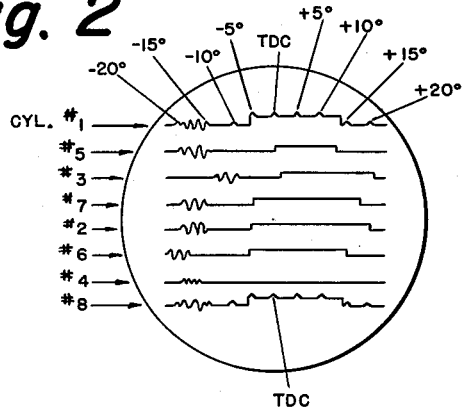
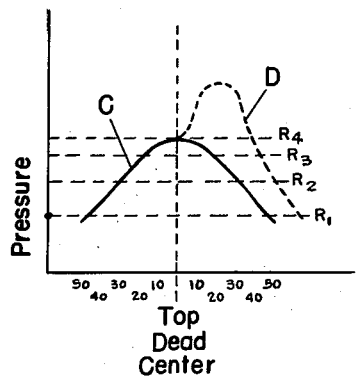
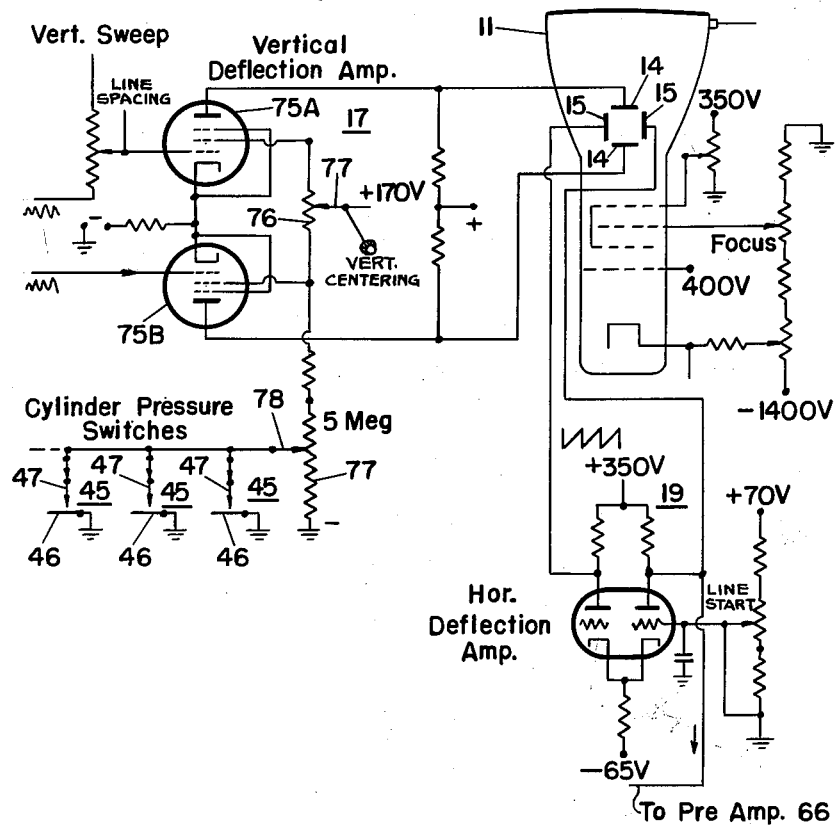

United States Patent Office 3,101,611
Patented Aug. 27, 1963

3,101,611
ANALYZER FOR INTERNAL COMBUSTION ENGINES
Alfred E. Traver, Great Neck, N.Y., assignor to Socony Mobil Oil Company, Inc., a corporation of New York
Filed July 20, 1960, Ser. No. 44,070
6 Claims. (Cl. 73—116)

This invention relates to systems for analyzing the operation of internal combustion engines particularly multi-cylinder diesel engines such as used in locomotives.

As in the test apparatus disclosed and claimed in my prior Patent 2,608,093, the present invention utilizes a cathode-ray oscilloscope so synchronized with the cycle of an internal combustion engine that the cathode-ray tube display has a raster whose lines in number may correspond with the number of cylinders of the engine.

In accordance with one aspect of the present invention, synchronizing pulses are produced at times in the engine cycle which are fixed with respect to the position of the pistons rather than at times varying in the engine cycle in dependence upon an operating variable, such as the advance of a spark ignition system.

More particularly, pulses for synchronizing the horizontal sweep generator of the oscilloscope are sequentially produced as each piston in turn reaches a fixed reference position in its compression stroke and pulses for synchronizing the vertical sweep generator are sequentially produced each time a particular one of the pistons reaches its reference position. Thus, the raster lines always start for preselected like positions of the pistons with the result that the time-relationship between events occurring for possibly different times in the operating cycle of the different cylinders is clearly evident from the raster. Such events include fuel injection and change in cylinder pressure in the case of diesel engines and spark plug firing in the case of internal combustion engines having an external ignition source.

More specifically, the means for producing the synchronizing pulses for the horizontal sweep generator may comprise a magnetic pickup device disposed adjacent a rotor, such as the engine fly-wheel or other member rotating in synchronism therewith having pole pieces or other flux-modifying means angularly spaced about its axis. The means for producing synchronizing pulses for the vertical sweep generator may likewise comprise a magnetic pickup device associated, however, with a rotor having a single pole piece or equivalent: alternatively, such vertical sweep synchronizing pulses may be derived by an electronic counter triggered from the horizontal sweep circuitry and set to provide one output pulse for a preselected number of input trigger pulses.

Further in accordance with the present invention, the analyzer may be provided with means to bring to the top of the raster the line corresponding with a particular cylinder: more particularly, such means may comprise a switch manually operable to inject additional synchronizing pulses into the horizontal sweep generator circuit.

Further in accordance with the present invention, marker pulses may be generated, as by a magnetic pickup device adjacent the path of movement of pole pieces on the engine fly-wheel or the like, and applied to the vertical-deflection circuit of the oscilloscope to appear in at least one of the raster lines as marker pips indicative of preselected angular positions of the fly-wheel.

Still further in accordance with the present invention, each engine cylinder may be provided with a pressure-responsive switch effective to change a biasing voltage of the vertical deflection amplifier so that each raster is vertically displaced for that portion of it for which the cylinder pressure is in excess of a preselected magnitude.

The invention further resides in an engine analyzer system having features of construction, combination and arrangement hereinafter described and claimed.

For a more detailed understanding of the invention, reference is made in the following description of a preferred embodiment thereof to the accompanying drawings in which:

FIG. 2 is an illustration of the raster display for an eight-cylinder diesel engine when there exists certain defects hereinafter discussed;

FIG. 3 is an explanatory figure referred to in discussion of the pressure-actuated switches of FIG. 1; and FIG. 4 is a wiring diagram of part of the analyzer system of FIG. 1.

Figure 1:
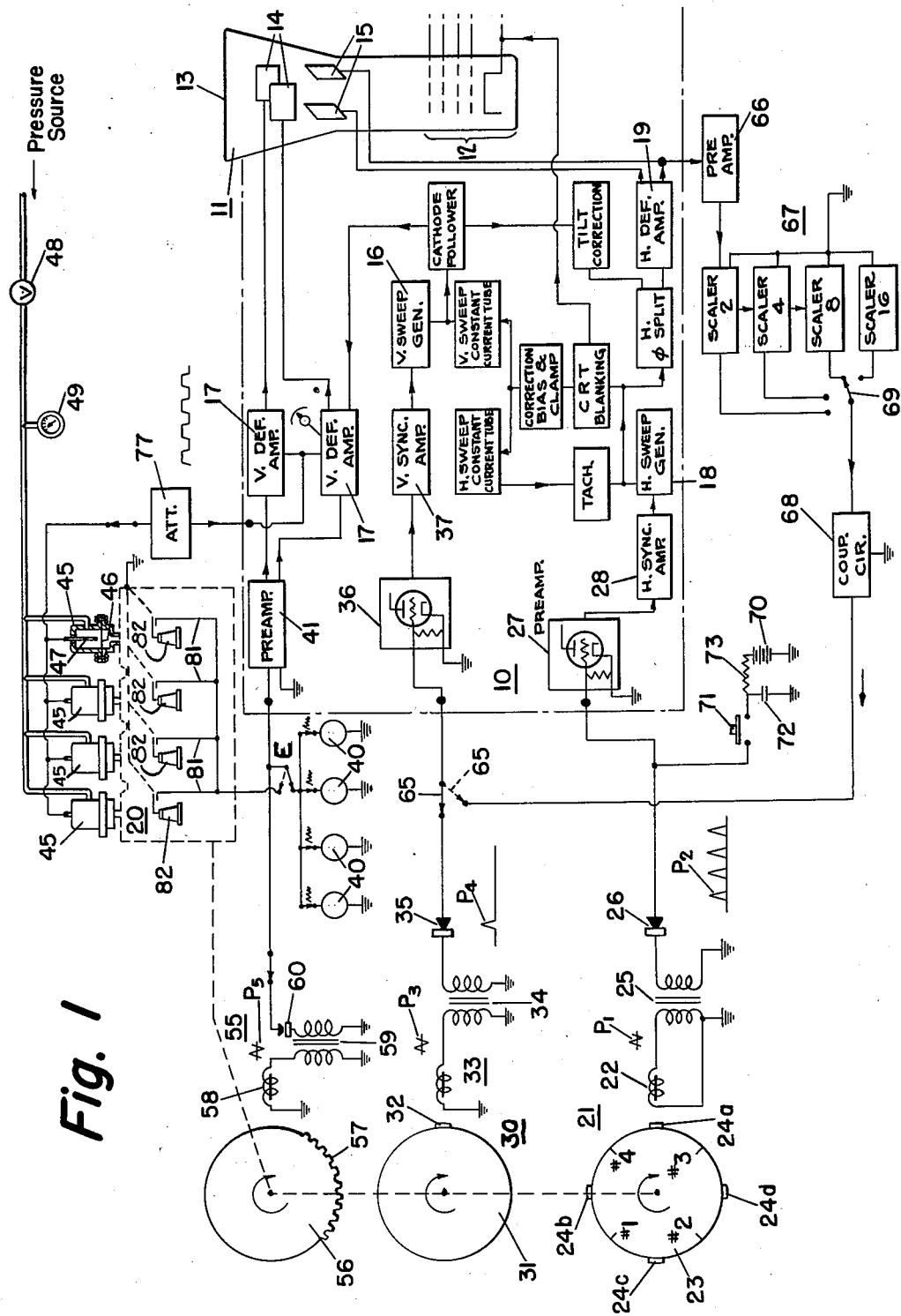
FIG. 1 is a block diagram schematically illustrating an analyzer system.

Referring to FIG. 1, the oscilloscope 10 includes a cathode ray tube 11 comprising an electron gun 12 which produces a cathode ray beam directed toward a phosphor coating on the inside of the face 13 of the tube. As is known, such beam may be deflected by magnetic or electric fields. When tube 11 is of the electrostatic deflection type shown by way of example, vertical deflection of the beam is effected by one pair of spaced plates 14, 14 and horizontal deflection of the beam is effected by a second pair of spaced plates 15, 15.

The vertical deflection system terminating in plates 14, 14 or an equivalent vertical deflection coil if tube 11 is of the magnetic deflection type, includes sweep generator 16 which produces a saw-tooth wave. The output of generator 16 as amplified by amplifier 17 is applied to effect vertical deflection of the cathode ray beam of tube 11. The horizontal deflection system terminating in plates 15, 15 or an equivalent horizontal deflection coil if tube 11 is of the magnetic deflection type, includes a second sweep generator 18 which also produces a saw-tooth wave. The output of generator 18 as amplified by amplifier 19 is applied to effect horizontal deflection of the cathode ray beam of tube 11.

By synchronizing the two sweep generators 16 and 18 as hereinafter described, the cathode beam produces or traces a raster visible on the face of the tube 11. In number, the lines of the raster correspond with the number of cylinders of the engine 20 under test and the length of each line corresponds with a preselected angular travel of the crank shaft of the engine.

Pulses for synchronizing the horizontal sweep generator 18 are produced by a pulse generator 21 comprising a pickup device 22 and a rotor 23 driven from the crank shaft of the engine. The rotor 23 may be the engine fly-wheel or other accessible rotating member of the engine. As shown, the pickup device 22 may comprise a permanent magnet and pickup coil assembly disposed adjacent the face or periphery of rotor 23 which is provided with means or structure which abruptly changes the magnetic flux traversing the pickup coil as each piston arrives at a particular point in its operating cycle. Such flux-changing means may comprise a series of pole pieces attached to the rotor or a series of holes drilled therein. Assuming each raster line is to represent 90° of crank angle with the center of the lines corresponding with the top dead center position of a corresponding piston, the pole pieces 24, or equivalent, are so located that each in turn passes the pickup device 22 when the corresponding piston crank is 45° in advance of top dead-center position.

As each pole piece, or equivalent, passes the pickup device 22, the induced pulse $P_1$ is first of one polarity and then the other. This pulse is converted to a unidirectional pulse $P_2$ of desired polarity to trigger or initiate a cycle of the horizontal sweep generator 18. In the particular arrangement shown, such conversion is effected by the signal transformer 25 and the rectifier 26 which may be a crystal diode. These unidirectional pulses are applied through preamplifier 27 and amplifier 28 as synchronizing pulses for the horizontal sweep generator 18.

Synchronization of the vertical sweep generator 16 may be effected by pulse generator 30 of type similar to generator 21, but whose rotor 31 has only a single pole piece 32 or equivalent. The magnetic pickup device 33 is disposed adjacent the path of travel of pole piece 32 and so produces one pulse per cycle of the engine. The pole piece 32 is so located on rotor 31 and the stationary pickup device 33 is so positioned that such induced pulse substantially coincides with one pulse of each series of pulses produced by the horizontal synchronizing generator 21: specifically, the timing may be such that the output pulse of pickup device 33 occurs when #1 piston is 45° in advance of its top dead center position. The bi-directional output pulses $P_3$ of the pickup device 33 are converted to unidirectional pulses $P_4$ as by signal transformer 34 and rectifier 35. These unidirectional pulses are applied through preamplifier 36 and amplifier 37 as synchronizing pulses for the vertical sweep generator 16.

With the system as thus far described, the tube 13 displays a raster whose vertically spaced horizontal lines respectively correspond with different cylinders of the engine in their firing sequence, each line serving as a time base for events occurring with a period including the top dead-center position of the associated piston and with all periods beginning at like times in the piston cycles.

One of the events significant in analysis of the operating condition of a diesel engine is fuel injection. This can be checked by vibration pickup devices 40 respectively clamped onto the injection lines from the fuel feed pump to the various cylinders. These devices may be of the type using a crystal or ceramic pickup cartridge which produces an output voltage when subjected to vibration. These pickup devices are connected in parallel in the input circuit of preamplifier 41 which feeds the vibration signals to the vertical deflection amplifier 17. Thus, as appears in FIG. 2, each raster line, near its left-hand end, has a vibration burst indicative of the fuel injection of the corresponding cylinder. The particular raster display shown in FIG. 2 indicates proper injection for cylinders #1, #7 and #8: late injection for cylinder #3, early injection for cylinder #6, and faulty injection for cylinder #4. For testing of such an 8-cylinder engine, the rotor 23 of FIG. 1 is provided with eight pole pieces each producing a pulse when the corresponding piston is 22.5° in advance of top dead center, the length of each line corresponding with 45° of crank shaft angle.

Another event significant in analysis of the operating condition of a diesel engine is cylinder pressure. This can be checked by balanced pressure switches 45 which are respectively responsive to the pressure of the several engine cylinders. In the particular form shown, each switch 45 comprises a diaphragm 46 which on one side is subjected to the variable pressure of the associated cylinder and which on the other side is subjected to a selected reference pressure from a pneumatic or hydraulic supply line. For a series of tests on the same engine, the valve 48 in the supply line may be adjusted to afford different reference pressures readable from gage 49. For a period in the cylinder cycle during which the cylinder pressure is in excess of the selected reference pressure, the diaphragm 46 is in engagement with contact 47 to complete a circuit effecting vertical displacement of part of the corresponding raster line, so to produce a square wave (FIG. 2). The particular raster pattern shown in FIG. 2 indicates proper pressure conditions for cylinders #1, #7 and #8: lack of fuel, faulty rings or poor valve action for cylinder #5, and excessive pressure for cylinder #2. The full-line curve C of FIG. 3 is typical of the variation of cylinder pressure due to compression of air as the piston approaches and passes beyond top dead center. The dotted-line curve D is typical of the enhanced pressure due to combustion of the injected fuel. A series of tests at different reference pressures $R_1$–$R_4$ affords a series of raster patterns exploratory of the pressure conditions of the engine cylinders.

In general, when all the vibration bursts are in good alignment vertically of the raster and all square waves are in good vertical alignment, the engine is in good operating condition. Misalignment is indicative of a mal-function of the engine and can, from the raster display, be traced to the particular cylinder or cylinders and the nature of the mal-function can be analyzed.

To facilitate visual checking of such alignment, means are provided for display of marker pips on the top and bottom lines of the raster (FIG. 2), the space between two successive pips corresponding with a selected number of degrees of each crank angle. The marker pips of FIG. 2 occur for each five degrees of crank angle. The pulses $P_5$ (FIG. 1) from which these marker pips are derived may be produced by a pulse generator 55 similar to the pulse generators 21 and 30 previously described. The rotor 56 of generator 55 is provided with a series of pole pieces 57 or equivalent flux-modifying means in number corresponding with the marker pulses for two successive raster lines. As each of these pole pieces passes the stationary magnetic pickup device 58, there is produced a bi-directional pulse $P_5$ which is converted by signal transformer 59 and rectifier 60 to a unidirectional pulse $P_6$. These unidirectional pulses are impressed upon the input circuit of preamplifier 41 and thus in amplified form upon the input circuit of the vertical deflection amplifier 17. The location of the series of pole pieces 57 relative to the angular position of pole piece 32 is such that the marker pips appear in the first and last lines of the raster corresponding with the first and last cylinders of the firing sequence. Due to the persistence of the phosphor of tube 11, all of the raster lines with their injection bursts and square pressure waves and with marker pips on the top and bottom lines are concurrently displayed for visual observation and/or photographic recording.

The system of FIG. 1 as thus far described with switch 65 in the full-line position shown is suited for two-cycle engines but is not suited for four-cycle engines. There is now described a method of vertical synchronization which suits the analyzer for testing both two-cycle and four-cycle engines. In accordance with this second method, the pulse generator 30 for providing the vertical synchronizing pulses need not be installed and switch 65 is thrown to the dotted-line position to receive vertical synchronizing pulses derived from selected horizontal sweep pulses.

Specifically, the output of the horizontal deflection amplifier 19 for the cathode ray tube 11 is also applied through a preamplifier 66 to an electronic counter chain or scaler 67 which can count 2, 4, 8, 16, etc. and repeat. The scaler 67 and its preamplifier 66 may be of transistor type and the scaler units may be conventional bistable multi-vibrators. The repeat or reset pulse of the scaler 67 is applied through coupling circuit 68 and switch 65 to the preamplifier 36 in the vertical synchronization circuit. In other words, the scaler 67 produces a vertical synchronization pulse for every 2, 4 and 8 horizontal sweep pulses depending upon the position of selector switch 69. For example, if four pole pieces 24a–24d are attached to fly-wheel 23 of an 8-cylinder, 4-cycle engine, the scaler is set to count eight so that the raster visible on the face of tube 11 represents one complete engine cycle of 720 crank-shaft degrees. Although the raster lines are in firing sequence, this method of synchronization, unlike that using the pulse generator 31, does not insure that the top line of the raster corresponds with cylinder #1 or any particular cylinder.

However, if the marker pulse generator 55 is used, the raster line corresponding with cylinder #1 can be easily identified and can be brought to the top of the raster by injecting additional horizontal synchronizing pulses until such position is reached. Specifically, a circuit for providing such additional pulses may comprise battery 70 or equivalent direct-current source and a normally open push button 71. By observing the raster as push button 71 is depressed one or more times, the two raster lines with marker pips may be brought to the position shown in FIG. 2, i.e., one to the top of the raster and the other to the bottom of the raster. Preferably and as shown, closure of the push button 71 effects discharge of a capacitor 72 charged by battery 70 through a current-limiting resistor 73 when the push button 71 is in open-circuit position.

In absence of the marker pulse generator 55, the raster line corresponding with cylinder #1 may be identified in other ways. For example, the connections to all of the vibration detectors, except the one for cylinder #1, may be temporarily broken. The single raster line now having a vibration burst may be brought to the top of the raster, if not already there, by depressing push button 71 the requisite number of times. Alternatively and by way of example, the electrical connections to all of the pressure switches may be broken except the one for cylinder #1. The single raster line now having a square wave corresponds with #1 cylinder; and if this line is not at the top of the raster, it may be brought there by injecting the required number of additional pulses into the horizontal synchronizing circuit.

The second method of synchronization using scaler 67 also makes it possible concurrently to display several successive engine cycles on the face of tube 11. For example, assuming a four-cylinder engine is being tested with the scaler set to count four and producing a four-line raster with each line corresponding to 180° crank angle, then all that is necessary in order to view four successive cycles is to switch the scaler to count 16. The display of two or more engine cycles is especially useful when the raster is to be photographed.

A preferred circuit arrangement for utilizing the pressure-responsive switch 45 of FIG. 1 to produce square waves on the raster lines is shown in FIG. 4. The output tubes 75A, 75B of the vertical deflection amplifier 17 are of the screen-grid type with their screen grids connected to one another by potentiometer 76. The movable contact of the potentiometer is connected to the positive terminal of a suitable direct-current source and is adjustable for vertical centering of the raster on the face of the tube. The screen grid of tube 75B is connected to the negative terminal of that source through a high-resistance potentiometer or attenuator 77. The movable contact 78 of attenuator 77 is connected to the ungrounded contacts 47 of the cylinder pressure switches 45. Thus, when a switch 45 is closed, the direct-current bias voltage on the screen grid electrode of tube 75B is substantially reduced to change the horizontal level of the corresponding raster line, so to form the leading edge of a square wave. The raster line continues at that level during its horizontal sweep to the right until the pressure switch 45 opens, whereupon the screen grid potential rises to its normal value and the raster returns to its original level—so forming the trailing end of the square wave. The other connections and components of FIG. 4, with the exception of the connection to the scaler 67 and preamplifier 66, are conventional and need not be discussed.

The analyzer of FIG. 1 may also be used to check the ignition system of internal combustion engines using spark plugs to ignite a combustible mixture of air or gasoline and the like. For such purpose, the switch E is moved from full-line to dotted-line position to connect the input circuit of the preamplifier 41 to a series of leads 81 respectively serving as antennas or probes in the electric field of the spark plugs 82 or of the high-tension leads extending thereto from the distributor.

The low oscillatory voltage picked up by each probe is displayed on the corresponding raster line and so affords a check on the ignition timing with respect to piston position. Absence of an ignition burst in only one raster line indicates a fault in the ignition circuit of the corresponding spark plug, such as a shorted plug, a break in the high-tension lead, a poor or broken terminal at the distributor cap or a poor distributor contact. Vertical misalignment in the raster of the ignition bursts or jitter of these bursts is indicative of faulty timing or operation of the timer or distributor contacts. From these examples, it should be evident that the raster display facilitates identification of faulty ignition circuits and components.

What is claimed is:

1. A multi-cylinder engine analyzer comprising a cathode-ray oscilloscope having horizontal and vertical deflection circuits each including a sweep generator, a first synchronizing means including structure rotating in synchronism with the crankshaft of said engine and producing an input pulse for triggering the horizontal sweep generator as each piston of said engine in turn passes through a reference position in its cylinder, a second synchronizing means for deriving from a preselected number of the output signals of said horizontal sweep generator an input signal for triggering the vertical sweep generator, said first and second synchronizing means cooperating with said sweep generators to produce a cathode-ray raster whose vertically spaced lines provide time bases each for at least one event occurring during the cycle of the corresponding piston, detector means respectively associated with said cylinders and responsive to said events to produce electrical signals applied to the vertical deflection circuit of said oscilloscope for appearance in the successive lines of the raster in correlation to piston reference position, and means for injecting additional pulses into said horizontal deflection circuit to bring the raster line corresponding with a particular cylinder to a desired position in the raster-line sequence.

2. A multi-cylinder engine analyzer as in claim 1 in which for diesel engine testing the detector means includes means respectively associated with the fuel injectors of the cylinders to produce signals indicative in the corresponding raster line of the time during which fuel is injected into the cylinder.

3. A multi-cylinder engine analyzer as in claim 1 additionally including means synchronized with the crankshaft of said engine and producing marker signals applied to said vertical deflection circuit to appear in at least one and less than all of the raster lines to indicate when the raster line of said particular cylinder is in desired position.

4. A multi-cylinder engine as in claim 1 in which the second synchronizing means comprises an inductive pickup means including magnetic structure rotating in synchronism with the crankshaft of said engine and producing a bidirectional pulse as said particular piston passes through its reference position, and rectifier means for converting the bidirectional pulse output of said inductive pickup means to unidirectional pulses and applying them to the amplifier preceding the sweep generator in the vertical deflection circuit.

5. A multi-cylinder engine analyzer comprising a cathode-ray oscilloscope having horizontal and vertical deflection circuits each including a sweep generator, a first synchronizing means including structure rotating in synchronism with the crankshaft of said engine and producing an input pulse for triggering the horizontal sweep generator as each piston of said engine in turn passes through a reference position in its cylinder, a second synchronizing means including an electronic counter triggered by signals from said horizontal deflection circuit and producing for a preselected number of said signals a repeat signal applied to reset the counter and to trigger the vertical sweep generator, said first and second synchronizing means cooperating with said sweep generators to produce a cathode-ray raster whose vertically spaced lines provide time bases each for at least one event occurring during the cycle of the corresponding piston, detector means respectively associated with said cylinders and responsive to said events to produce electrical signals applied to the vertical deflection circuit of said oscilloscope for appearance in the successive lines of the raster in correlation to piston reference position, and means for injecting additional pulses into the horizontal deflection circuit to bring the raster line corresponding with a particular cylinder to a desired position in the raster-line sequence.

6. A multi-cylinder engine analyzer comprising a cathode-ray oscilloscope having a horizontal deflection circuit including a sweep generator, and a vertical deflection circuit including a sweep generator followed by an amplifier; a first synchronizing means including structure rotating in synchronism with the crankshaft of said engine and producing an input pulse for triggering the horizontal sweep generator as each piston of said engine in turn passes through a reference position in its cylinder, a second synchronizing means for producing an input pulse for triggering said vertical sweep generator when a particular one of said pistons passes through its reference position, said first and second synchronizing means cooperating with said sweep generators to produce a cathode-ray raster whose vertically spaced lines provide time bases each for at least one event occurring during the cycle of the corresponding piston, and pressure-responsive means respectively associated with the cylinders and controlling a biasing voltage of said vertical deflection amplifier to produce in each raster line a square wave whose width corresponds with the period for which a corresponding cylinder pressure exceeds a preselected magnitude.

References Cited in the file of this patent
UNITED STATES PATENTS

| | | |
|---|---|---|
| 2,178,218 | Bedford | Oct. 31, 1939 |
| 2,666,325 | Withers et al. | Jan. 19, 1954 |
| 2,688,126 | Weller | Aug. 31, 1954 |
| 2,691,888 | Daulby | Oct. 19, 1954 |
| 2,924,712 | Edens | Feb. 9, 1960 |
| 2,941,396 | Adams | June 21, 1960 |
| 2,973,638 | Fluegel | Mar. 7, 1961 |